(12) United States Patent
Funk et al.

(10) Patent No.: US 7,960,485 B2
(45) Date of Patent: Jun. 14, 2011

(54) METHOD FOR PRODUCING WATER-ABSORBING POLYMERS

(75) Inventors: Rüdiger Funk, Niedernhausen (DE); Uwe Stueven, Bad Soden (DE); Friedrich-Georg Martin, Heidelberg (DE); Jürgen Schröder, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 998 days.

(21) Appl. No.: 11/666,962

(22) PCT Filed: Nov. 16, 2005

(86) PCT No.: PCT/EP2005/012282
§ 371 (c)(1),
(2), (4) Date: May 2, 2007

(87) PCT Pub. No.: WO2006/053731
PCT Pub. Date: May 26, 2006

(65) Prior Publication Data
US 2008/0214750 A1    Sep. 4, 2008

(30) Foreign Application Priority Data
Nov. 18, 2004 (DE) .................. 10 2004 055 765

(51) Int. Cl.
*C08F 2/04* (2006.01)
*C08F 20/06* (2006.01)

(52) U.S. Cl. .................. 526/77; 526/201; 526/318.5

(58) Field of Classification Search .............. 526/77, 526/201, 318.5; 562/600
See application file for complete search history.

(56) References Cited

U.S. PATENT DOCUMENTS

| | | | |
|---|---|---|---|
| 4,828,652 A | 5/1989 | Schropp et al. | |
| 5,837,789 A | 11/1998 | Stockhausen et al. | |
| 6,143,821 A | 11/2000 | Houben et al. | |
| 6,448,439 B1 | 9/2002 | Eck et al. | |
| 6,455,732 B1 * | 9/2002 | Aichinger et al. | 562/598 |
| 6,646,161 B1 * | 11/2003 | Eck et al. | 562/600 |
| 6,700,016 B1 * | 3/2004 | Eck et al. | 562/600 |
| 6,921,837 B2 | 7/2005 | Eck et al. | |
| 7,332,625 B2 | 2/2008 | Dubois et al. | |
| 2004/0049077 A1 | 3/2004 | Eck et al. | |
| 2004/0256319 A1 | 12/2004 | Hammon et al. | |
| 2005/0165208 A1 | 7/2005 | Popp et al. | |
| 2005/0209411 A1 | 9/2005 | Nestler et al. | |
| 2006/0036043 A1 | 2/2006 | Nestler et al. | |

FOREIGN PATENT DOCUMENTS

| | | |
|---|---|---|
| BE | 767028 | 11/1971 |
| DE | 2 120 956 | 11/1971 |
| DE | 36 41 996 | 6/1988 |
| DE | 195 43 368 | 5/1997 |
| DE | 196 46 484 | 5/1997 |
| DE | 100 03 497 | 4/2001 |
| DE | 102 21 202 | 7/2003 |
| DE | 102 21 203 | 7/2003 |
| DE | 102 57 449 | 11/2003 |
| EP | 0 574 260 | 12/1993 |
| EP | 0 942 014 | 9/1999 |
| EP | 1 302 485 | 4/2003 |
| WO | WO-94/09043 | 4/1994 |
| WO | WO 9409043 A1 * | 4/1994 |
| WO | WO-99/14181 | 3/1999 |
| WO | WO-00/75097 | 12/2000 |
| WO | WO-03/041832 | 5/2003 |
| WO | WO-03/051940 | 6/2003 |
| WO | WO-03/095510 | 11/2003 |
| WO | WO-2004/024665 | 3/2004 |
| WO | WO-2004/087635 | 10/2004 |

OTHER PUBLICATIONS

English Translation of DE 100 03 497 A1, dated Jan. 27, 2000.
Bonet et al., "Ullmann's Encyclopedia of Industrial Chemistry," 6th Edition, vol. 1, pp. 289-296 (2002).
Bonet et al., "Ullmann's Encyclopedia of Industrial Chemistry," 6th Edition, vol. 35, pp. 73-103 (2002).
Buccholz et al., "Modern Superabsorbent Polymer Technology," Wiley-VCH (1998).
International Search Report in PCT/EP2005/012282 dated Jan. 25, 2006.

* cited by examiner

*Primary Examiner* — Michael M Bernshteyn
(74) *Attorney, Agent, or Firm* — Marshall, Gerstein & Borun LLP

(57) ABSTRACT

The invention relates to processes for preparing water absorbing polymers by polymerization of a monomer solution comprising allyl acrylate and/or allyl alcohol, the solution comprising not more than 0.002% by weight of allyl acrylate and/or allyl alcohol, based on acrylic acid, to aqueous monomer solutions for producing water absorbing polymers, to water absorbing polymers, to processes for producing hygiene articles and also to hygiene articles.

13 Claims, No Drawings

METHOD FOR PRODUCING WATER-ABSORBING POLYMERS

CROSS-REFERENCE TO RELATED APPLICATIONS

This is the U.S. national phase application of International Application No. PCT/EP2005/012282, filed Nov. 16, 2005, which claims the benefit of German Patent Application No. 10 2004 055 765.9, filed Nov. 18, 2004.

The present invention concerns processes for preparing water absorbing polymers by polymerization of a monomer solution, aqueous monomer solutions for preparing water absorbing polymers, water absorbing polymers, processes for producing hygiene articles and also hygiene articles.

Further embodiments of the present invention are discernible from the claims, the description and the examples. It will be appreciated that the hereinbefore identified and the hereinafter to be more particularly described features of the subject matter of the present invention are utilizable not only in the particular combination indicated but also in other combinations without departing the realm of the present invention.

Water absorbing polymers are in particular polymers of (co)polymerized hydrophilic monomers, graft (co)polymers of one or more hydrophilic monomers on a suitable grafting base, crosslinked ethers of cellulose or of starch, crosslinked carboxymethylcellulose, partially crosslinked polyalkylene oxide or natural products swellable in aqueous fluids, examples being guar derivatives. Such polymers are used as products capable of absorbing aqueous solutions to manufacture diapers, tampons, sanitary napkins and other hygiene articles, but also as water retaining agents in market gardening.

The production of water absorbing polymers is described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, Volume 35, pages 73 to 103. Acrylic acid and acrylic acid salts are by far the most important monomers for preparing water absorbing polymers.

Acrylic acid can be produced by various processes. These processes are described for example in Ullmann's Encyclopedia of Industrial Chemistry, 6th edition, Volume 1, pages 289 to 296. The two stage oxidation of propene is currently the most important process.

Water absorbing polymers ideally have a low level of extractables and of unconverted monomers. More particularly, extractables can be leached out of the water insoluble, water swellable polymers in the use of the water absorbing particles, and thus do not contribute anything to the polymers' absorptive performance. Unconverted monomers, such as acrylic acid, can be released as well in the process, and this is undesirable because of the skin irritating effect.

The present invention therefore has for its object to provide an improved process for preparing water absorbing polymers whereby a product having minimal extractables and little residual monomer is obtained.

The two stage oxidation of propene, as well as acrylic acid, produces by and secondary products which would disrupt the polymerization and have to be separated from acrylic acid.

DE-A-39 41 996 describes the disruptive influence of aldehydes in acrylic acid polymerization and discloses a process to chemically separate the aldehydes from acrylic acid.

DE-A-102 21 203 teaches the extraction of aldehydic impurities from aqueous sodium acrylate solutions.

DE-A-22 10 956 discloses that protoanemonin retards the polymerization of acrylic acid, and teaches the distillative purification of acrylic acid.

EP-A-1 302 485 describes a process for preparing water absorbing polymers. The reference discloses that a high level of protoanemonin in the acrylic acid used leads to an increased fraction of residual monomer and extractables in the water absorbing polymer. Acrylic acid has a lower boiling point and can be separated from protoanemonin by distillation.

EP-A-0 574 260 discloses a process for preparing water absorbing polymers having little residual monomer. The reference teaches that the residual monomer content is dependent on the concentration of $\beta$-hydroxypropionic acid in the monomer solution and recommends the use of freshly distilled acrylic acid.

DE-A-102 57 449 discloses the influence of oligomeric acrylic acids on the residual monomer content of water absorbing polymers and states that oligomeric acrylic acid can be removed by crystallization.

DE-A-102 21 202 discloses a process for preparing water absorbing polymers having a low residual monomer content wherein acrylic acid is purified by crystallization and the monomer solution is prepared by dissolving acrylic acid crystals in aqueous sodium hydroxide solution.

As well as the abovementioned impurities, acrylic acid produced by propene oxidation also comprises allyl acrylate. Compounds having two or more ethylenically unsaturated groups, such as allyl acrylate, are used as crosslinkers in the production of water absorbing polymers, and compounds similar to allyl acrylate are indeed used for that purpose. DE-A-195 43 368 and DE-A-196 46 484 for example identify crosslinkers comprising an allyl group and an acrylate group. According to the monograph "Modern Superabsorbent Polymer Technology", F. L. Buchholz and A. T. Graham, Wiley-VCH, 1998, pages 20 to 23 and 74 to 77, allyl methacrylate (which is very similar to allyl acrylate) is a customary crosslinker.

Since water absorbing polymers are typically produced using not less than 0.1% by weight of crosslinker, based on acrylic acid, the removal of allyl acrylate from acrylic acid has hitherto not been considered important. In particular because it is very difficult to separate allyl acrylate from acrylic acid.

The boiling point difference between acrylic acid and allyl acrylate is small, which makes separation by distillation difficult. For example, commercially available acrylic acid comprises even larger quantities of acetic acid, even though acetic acid's more favorable boiling point makes for easier separation from acrylic acid.

It is the structural similarity to acrylic acid which in contrast makes separation by crystallization difficult. For instance, furfural in acrylic acid can be depleted by a factor of more than 50 in a single stage crystallization. For allyl acrylate, by contrast, the depletion factor is only about 7. Thus, the acrylic acid used to produce water absorbing polymers hitherto did comprise allyl acrylate.

The monograph "Modern Superabsorbent Polymer Technology", F. L. Buchholz and A. T. Graham, Wiley-VCH, 1998, pages 121 and 122, contains a gas chromatogram of commercially available acrylic acid. The acrylic acid analyzed still comprises about 0.003% by weight of allyl acrylate.

We have now found that, surprisingly, even low concentrations of allyl acrylate have an adverse effect on the production of water absorbing polymers. More particularly, even low allyl acrylate concentrations lead to increased extractables and to elevated residual monomer contents. The same applies to allyl alcohol whether the allyl alcohol is already present in the acrylic acid or only formed, by hydrolysis of allyl acrylate, in the course of the preparation of the at least partially neutralized monomer solution.

The object of the present invention is achieved by a process for preparing water absorbing polymers by polymerization of a monomer solution comprising
a) acrylic acid, which may be partially or completely neutralized,
b) at least one crosslinker,
c) allyl acrylate and/or allyl alcohol,
d) if appropriate one or more ethylenically and/or allylically unsaturated monomers copolymerizable with the monomers identified under a), and
e) if appropriate one or more water soluble polymers,
wherein the solution comprises not more than 0.002% by weight of allyl acrylate and/or allyl alcohol, based on acrylic acid.

Preference is given to using aqueous solutions of monomer. The hydrogels prepared according to the process of the present invention may be dried, ground and classified.

The water absorbing polymers are postcrosslinked in a preferred embodiment.

The production of water absorbing polymers is described for example in the monograph "Modern Superabsorbent Polymer Technology", F. L. Buchholz and A. T. Graham, Wiley-VCH, 1998, or in Ullmann's Encyclopedia of Industrial Chemistry, 6th edition, Volume 35, pages 73 to 103.

The water absorbing polymers typically have a centrifuge retention capacity (CRC) of not less than 15 g/g, preferably not less than 20 g/g and more preferably not less than 25 g/g. Centrifuge retention capacity (CRC) is determined according to EDANA (European Disposables and Nonwovens Association) recommended test method No. 441.2-02 "Centrifuge retention capacity".

The postcrosslinked water absorbing polymers typically have an absorbency under a load of 0.7 psi (4.83 kPa) of not less than 15 g/g, preferably not less than 20 g/g and more preferably not less than 25 g/g. Absorbency under load (AUL) is determined according to EDANA (European Disposables and Nonwovens Association) recommended test method No. 442.2-02 "Absorption under pressure".

The level of allyl acrylate and/or allyl alcohol is preferably not more than 0.0015% by weight, more preferably not more than 0.001% by weight and most preferably not more than 0.0005% by weight, all based on acrylic acid, a level of x % by weight of allyl acrylate and/or allyl alcohol signifying a level of y % by weight of allyl acrylate and z % by weight of allyl alcohol subject to the relation x=y+z and y, z≦x.

The weight ratio z/y is preferably not less than 0.001, more preferably not less than 0.1 and most preferably not less than 0.5 and preferably not more than 500, more preferably not more than 50 and most preferably not more than 1.

The fraction of acrylic acid in the mixture a) to e) is typically not less than 50% by weight, preferably not less than 80% by weight, more preferably not less than 95% by weight and most preferably not less than 99% by weight, the presence of the components d) and e) being optional in each case.

The acrylic acid used is preferably produced by gas phase oxidation of propane, propene and/or acrolein, in one, two or three stages. Preference is given to the two stage oxidation of propene where propene is converted to acrolein in a first stage and acrolein to acrylic acid in a second stage.

Acrylic acid is isolated from the reaction mixture in a known manner, for example by fractional condensation, as described in DE-A-197 40 253, by total condensation, as described in DE-A-34 29 391 and DE-A-21 64 767, or by absorption into a suitable absorption medium. Examples of suitable absorption media are high boiling organic solvents, as described in DE-A-21 36 396 and DE-A-43 08 087, and water, as described in EP-A-0 511 111.

The acrylic acid produced by these processes typically comprises less than 2% by weight, preferably less than 1.5% by weight, more preferably less than 1% by weight and most preferably less than 0.5% by weight of impurities, i.e., the acrylic acid content is typically not less than 98% by weight, preferably not less than 98.5% by weight, more preferably not less than 99% by weight and most preferably not less than 99.5% by weight.

The acrylic acid produced by the abovementioned processes typically still comprises not less than 0.02% by weight, 0.015% by weight, 0.01% by weight or 0.005% by weight of allyl acrylate and/or allyl alcohol.

In the process of the present invention, the acrylic acid is further purified, preferably by crystallization, before being used to prepare water absorbing polymers.

In crystallization, a portion of the acrylic acid is crystallized by cooling. The crystals are separated from the mother liquor and melted and dissolved in water or aqueous sodium hydroxide solution. Preferably, small amounts of a polymerization inhibitor, preferably of a hydroquinone half ether, such as hydroquinone monomethyl ether, is added to the acrylic acid. The amount is typically in the range from 0.0001% to 0.015% by weight, preferably in the range from 0.0005% to 0.013% by weight and more preferably in the range from 0.003% to 0.007% by weight.

The acrylic acid is crystallized one or more times, preferably two times, three times or four times and more preferably two times, until the desired degree of purity is achieved. The operation is preferably carried out countercurrently, i.e., the mother liquor of any one crystallization stage is fed to whichever is the preceding crystallization stage. If appropriate, still further purifying steps are carried out.

In an alternative embodiment, the mother liquor obtained in the crystallization, preferably the mother liquor obtained in the first stage in the case of a multistage crystallization, is fed to a simple distillation or to a fractional distillation. Acrylic acid is distilled overhead and the substantially involatile impurities in the mother liquor, such as maleic acid, maleic anhydride and process inhibitors, i.e., high performance polymerization inhibitors, such as phenothiazine and hydroquinone, are removed from the system as bottom product. Processes for this purpose are known from WO-A-00/01657. Advantageously, a falling film evaporator is used for the simple distillation of the mother liquor. The mother liquor can then be sent to another use, for example to prepare acrylic esters, or returned into the crystallization.

The crystallization in any one crystallization stage is preferably carried on to the point where not less than 20% by weight and preferably not less than 40% by weight of the acrylic acid is crystallized out. Typically not more than 90% by weight, preferably not more than 80% by weight and especially not more than 70% by weight of the acrylic acid used in any one crystallization stage is crystallized out in that crystallization stage in order that an adequate purifying effect may be achieved.

Useful crystallizers for the process of the present invention are as such not subject to any restriction. Crystallizers based on the formation of crystals on cooled surfaces will be found to be particularly useful. Such crystallization processes are also referred to as layer crystallization. Suitable apparatuses are to be found in the patent specifications cited in DE-A-102 57 449 at page 4 lines 6 and 7.

For layer crystallization, the acrylic acid to be purified is brought into contact with the cooled surfaces of a heat exchanger. The heat exchanger surfaces of the crystallizer are preferably cooled to temperatures up to 40° C. below the melting temperature of the acrylic acid to be purified. Once the desired degree of crystallization is attained, the cooling is terminated and the liquid mother liquor is removed, for example by pumping it down or draining. The purified, crystalline acrylic acid is typically isolated by melting the crystalline acrylic acid, for example by heating the heat exchanger surfaces to a temperature above the melting temperature of acrylic acid and/or by adding a melt of purified acrylic acid. The purified acrylic acid is obtained as a melt and is isolated as such. Similarly, the crystalline acrylic acid can be dissolved in water or aqueous sodium hydroxide solution and the solution thus obtained used directly in the subsequent polymerization.

An example of an additional purifying step is to incipiently sweat the layer of crystals which has deposited on heat exchanger surfaces in the course of layer crystallization. To incipiently sweat the deposited layer of crystals, the temperature of the layer of crystals is raised somewhat, for example by 0.5 to 5° C. above the melting temperature, causing the less pure regions of the layer of crystals to melt off preferentially and so provide an additional purifying effect. The sweated product is then fed into the mother liquor and further processed together with it. It is also possible to treat the layer of crystals with a purifying liquid, for example with a melt of already purified acrylic acid.

The temperature required for layer crystallization depends on the degree of impurity. The upper limit is naturally that temperature at which the already crystallized acrylic acid is in equilibrium with the acrylic acid in the mother liquor (the equilibrium temperature). Depending on the composition of the crude product, the equilibrium temperature will be in the range from 5 to 13.5° C. The temperature of the acrylic acid to be crystallized is preferably in the range from 0 to 13.5° C. and preferably in the range from 5 to 12° C., highly supercooled melts typically being avoided. More particularly, in dynamic layer crystallization, the cooling medium required to remove the heat of crystallization is cooled down from about +5 to −5° C. to about −10 to −25° C. during the crystallization process. When the layer crystallization process is carried out as a static operation, the cooling medium is preferably cooled from a temperature of about +5 to −15° C. down to about −15 to −30° C. during the crystallization process.

In one embodiment of the crystallization process, the layer crystallization is carried out in the presence of seed crystals.

The crystallization on cooling surfaces can be carried out as a dynamic process or as a static process. Dynamic processes are known for example from EP-A-0 616 998 and static processes for example from U.S. Pat. No. 3,597,164. In the dynamic crystallization processes, the crude product to be crystallized is maintained in a flowing movement. This can be accomplished through a forced flow in fully flooded heat exchangers, as described in DE-A-26 06 364, or through a trickle film on a cooled wall, such as cooling rolls or cooling belts. In static crystallization, mass transfer in the liquid phase takes place only through free convection (quiescent melt). Layer crystallization on cooling surfaces in dynamic operation is preferred in the present invention.

As an alternative to layer crystallization, the crystallization can also be carried out as a suspension crystallization. In suspension crystallization, the crude product is cooled to create a suspension of crystals in a melt which is enriched with regard to impurities. The crystals can grow directly in the suspension (melt) or settle out as a layer on a cooled wall, from which they are subsequently scraped and suspended in the rest of the melt. The suspension of crystals is preferably agitated during the process, especially by pumped recirculation or stirring. Suspension crystallization can be operated continuously or batchwise, preferably continuously.

The acrylic acid used as a starting material for crystallization typically comprises less than 2% by weight, preferably less than 1.5% by weight, more preferably less than 1% by weight and most preferably less than 0.5% by weight of impurities, i.e., the acrylic acid content is typically not less than 98% by weight, preferably not less than 98.5% by weight, more preferably not less than 99% by weight and most preferably not less than 99.5% by weight.

The acrylic acid used as a starting material for crystallization typically still comprises not less than 0.02% by weight, 0.015% by weight, 0.01% by weight or 0.005% by weight of allyl acrylate and/or allyl alcohol.

The acrylic acid produced by crystallization comprises not more than 0.002% by weight, preferably not more than 0.0015% by weight, more preferably not more than 0.001% by weight and most preferably not more than 0.0005% by weight of allyl acrylate and/or allyl alcohol, all based on acrylic acid.

The acrylic acid a) preferably comprises not more than 0.015% by weight of a hydroquinone half ether. Preferred hydroquinone half ethers are hydroquinone monomethyl ether (MEHQ) and/or tocopherols.

Tocopherol refers to compounds of the following formula:

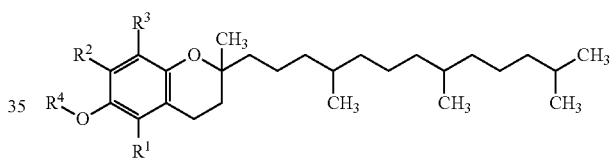

where $R^1$ is hydrogen or methyl, $R^2$ is hydrogen or methyl, $R^3$ is hydrogen or methyl and $R^4$ is hydrogen or an acyl radical having 1 to 20 carbon atoms.

Preferred radicals for $R^4$ are acetyl, ascorbyl, succinyl, nicotinyl and other physiologically acceptable carboxylic acids. The carboxylic acids can be mono-, di- or tricarboxylic acids.

Preference is given to alpha-tocopherol where $R^1=R^2=R^3=$methyl, especially racemic alpha-tocopherol. $R^4$ is more preferably hydrogen or acetyl. RRR-alpha-Tocopherol is especially preferred.

The amount of hydroquinone half ether added to acrylic acid a) is preferably in the range from 5 to 130 ppm, more preferably in the range from 30 to 70 ppm and especially around 50 ppm.

The water absorbing polymers are in a crosslinked state, i.e., the addition polymerization is carried out in the presence of compounds having two or more polymerizable groups which can be free radically interpolymerized into the polymer network. Useful crosslinkers b) include for example ethylene glycol dimethacrylate, diethylene glycol diacrylate, allyl methacrylate, trimethylolpropane triacrylate, triallylamine, tetraallyloxyethane as described in EP-A-0 530 438, di- and triacrylates as described in EP-A-0 547 847, EP-A-0 559 476, EP-A-0 632 068, WO-A-93/21237, WO-A-03/104299, WO-A-03/104300, WO-A-03/104301 and in German patent application 103 31 450.4, mixed acrylates which, as well as acrylate groups, comprise further ethylenically unsaturated groups, as described in German patent applications 103 31

456.3 and 103 55 401.7, or crosslinker mixtures as described for example in DE-A-195 43 368, DE-A-196 46 484, WO-A-90/15830 and WO-A-02/32962.

Useful crosslinkers b) include in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate, ethylene glycol dimethacrylate and also trimethylolpropane triacrylate and allyl compounds, such as allyl (meth) acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EP-A-0 343 427. Useful crosslinkers b) further include pentaerythritol diallyl ether, pentaerythritol triallyl ether, pentaerythritol tetraallyl ether, polyethylene glycol diallyl ether, ethylene glycol diallyl ether, glycerol diallyl ether, glycerol triallyl ether, polyallyl ethers based on sorbitol, and also ethoxylated variants thereof. The process of the present invention preferably utilizes di(meth)acrylates of polyethylene glycols, the polyethylene glycol used having a molecular weight between 300 and 1000.

However, particularly advantageous crosslinkers b) are di- and triacrylates of altogether 3- to 15-tuply ethoxylated glycerol, of altogether 3- to 15-tuply ethoxylated trimethylolpropane, especially di- and triacrylates of altogether 3-tuply ethoxylated glycerol or of altogether 3-tuply ethoxylated trimethylolpropane, of altogether 3-tuply propoxylated glycerol, of altogether 3-tuply propoxylated trimethylolpropane, and also of altogether 3-tuply mixedly ethoxylated or propoxylated glycerol, of altogether 3-tuply mixedly ethoxylated or propoxylated trimethylolpropane, of altogether 15-tuply ethoxylated glycerol, of altogether 15-tuply ethoxylated trimethylolpropane, of altogether 40-tuply ethoxylated glycerol and also of altogether 40-tuply ethoxylated trimethylolpropane.

Very particularly preferred for use as crosslinkers b) are diacrylated, dimethacrylated, triacrylated or trimethacrylated multiply ethoxylated and/or propoxylated glycerols as described for example in prior German patent application DE 103 19 462.2. Di- and/or triacrylates of 3- to 10-tuply ethoxylated glycerol are particularly advantageous. Very particular preference is given to di- or triacrylates of 1- to 5-tuply ethoxylated and/or propoxylated glycerol. The triacrylates of 3- to 5-tuply ethoxylated and/or propoxylated glycerol are most preferred. These are notable for particularly low residual levels (typically below 10 ppm) in the water absorbing polymer and the aqueous extracts of water absorbing polymers produced therewith have an almost unchanged surface tension compared with water at the same temperature (typically not less than 0.068 N/m).

Examples of ethylenically unsaturated monomers d) copolymerizable with acrylic acid a) are methacrylic acid, maleic acid, fumaric acid, itaconic acid, acrylamide, methacrylamide, crotonamide, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate.

Useful water soluble polymers e) include polyvinyl alcohol, polyvinylpyrrolidone, starch, starch derivatives, polyglycols or polyacrylic acids, preferably polyvinyl alcohol and starch.

The preparation of a suitable base polymer and also further useful hydrophilic ethylenically unsaturated monomers d) are described in DE-A-199 41 423, EP-A-0 686 650, WO-A-01/45758 and WO-A-03/104300.

Water absorbing polymers are typically obtained by addition polymerization of an aqueous monomer solution with or without subsequent comminution of the hydrogel. Suitable methods of making are described in the literature. Water absorbing polymers are obtainable for example by gel polymerization in the batch process or tubular reactor and subsequent comminution in meat grinder, extruder or kneader (EP-A-0 445 619, DE-A-19 846 413)

addition polymerization in kneader with continuous comminution by contrarotatory stirring shafts for example (WO-A-01/38402)

addition polymerization on belt and subsequent comminution in meat grinder, extruder or kneader (DE-A-38 25 366, U.S. Pat. No. 6,241,928)

emulsion polymerization, which produces bead polymers having a relatively narrow gel size distribution (EP-A-0 457 660)

in situ addition polymerization of a woven fabric layer which, usually in a continuous operation, has previously been sprayed with aqueous monomer solution and subsequently been subjected to a photopolymerization (WO-A-02/94328, WO-A-02/94329).

The reaction is preferably carried out in a kneader as described for example in WO-A-01/38402, or on a belt reactor as described for example in EP-A-0 955 086.

The acid groups of the hydrogels obtained typically are partially neutralized, preferably to an extent of in the range from 25 to 85 mol %, more preferably to an extent in the range from 27 to 80 mol % and even more preferably to an extent in the range from 27 to 30 mol % or 40 to 75 mol %, for which the customary neutralizing agents can be used, preferably alkali metal hydroxides, alkali metal oxides, alkali metal carbonates or alkali metal bicarbonates and also mixtures thereof. Instead of alkali metal salts it is also possible to use ammonium salts. Sodium and potassium are particularly preferred as alkali metals, but most preference is given to sodium hydroxide, sodium carbonate or sodium bicarbonate and also mixtures thereof. Neutralization is customarily achieved by admixing the neutralizing agent as an aqueous solution or else preferably as a solid material.

Neutralization can be carried out after polymerization, at the hydrogel stage. But it is also possible to neutralize up to 40 mol %, preferably from 10 to 30 mol % and more preferably from 15 to 25 mol % of the acid groups before polymerization by adding a portion of the neutralizing agent to the monomer solution and to set the desired final degree of neutralization only after polymerization, at the hydrogel stage. The monomer solution can be neutralized by mixing the neutralizing agent. The hydrogel may be mechanically comminuted, for example by means of a meat grinder, in which case the neutralizing agent can be sprayed, sprinkled or poured on and then carefully mixed in. To this end, the gel mass obtained can be repeatedly rinsed for homogenization. Neutralization of the monomer solution to the final degree of neutralization is preferred.

The rest of the treatment of the hydrogel obtained, the acid groups of which can be at least partially neutralized, is not important to the process of the present invention. The process of the present invention may further comprise the steps of drying, grinding, sieving and/or postcrosslinking for example.

The neutralized hydrogel is then dried with a belt or drum dryer until the residual moisture content is preferably below 10% by weight and especially below 5% by weight, the water content being determined according to EDANA (European Disposables and Nonwovens Association) recommended test method No. 430.2-02 "Moisture content". The dried hydrogel is thereafter ground and sieved, useful grinding apparatus typically including roll mills, pin mills or swing mills. The particle size of the sieved, dry hydrogel is preferably below 1000 μm, more preferably below 900 μm and most preferably below 800 μm and preferably above 100 μm, more preferably above 150 μm and most preferably above 200 μm.

Very particular preference is given to a particle size (sieve cut) in the range from 106 to 850 μm. The particle size is determined according to EDANA (European Disposables and Nonwovens Association) recommended test method No. 420.2-02 "Particle size distribution".

The base polymers are then preferably surface postcrosslinked. Useful postcrosslinkers are compounds comprising two or more groups capable of forming covalent bonds with the carboxylate groups of the hydrogel. Suitable compounds are for example alkoxysilyl compounds, polyaziridines, polyamines, polyamidoamines, di- or polyglycidyl compounds, as described in EP-A-0 083 022, EP-A-543 303 and EP-A-937 736, di- or polyfunctional alcohols, as described in DE-C-33 14 019, DE-C-35 23 617 and EP-A-450 922, or β-hydroxyalkylamides, as described in DE-A-102 04 938 and U.S. Pat. No. 6,239,230.

Useful surface postcrosslinkers are further said to include by DE-A-40 20 780 cyclic carbonates, by DE-A-198 07 502 2 oxazolidone and its derivatives, such as 2-hydroxyethyl-2-oxazolidone, by DE-A-198 07 992 bis- and poly-2-oxazolidinones, by DE-A-198 54 573 2 oxotetrahydro-1,3-oxazine and its derivatives, by DE-A-198 54 574 N-acyl-2-oxazolidones, by DE-A-102 04 937 cyclic ureas, by German patent application 103 34 584.1 bicyclic amide acetals, by EP-A-1 199 327 oxetanes and cyclic ureas and by WO-A-03/031482 morpholine-2,3-dione and its derivatives.

Postcrosslinking is typically carried out by spraying a solution of the surface postcrosslinker onto the hydrogel or onto the dry base-polymeric powder. After spraying, the polymeric powder is thermally dried, and the crosslinking reaction may take place not only before but also during drying.

The spraying with a solution of the crosslinker is preferably carried out in mixers having moving mixing implements, such as screw mixers, paddle mixers, disk mixers, plowshare mixers and shovel mixers. Particular preference is given to vertical mixers and very particular preference to plowshare mixers and shovel mixers. Useful mixers include for example Lödige® mixers, Bepex® mixers, Nauta® mixers, Processall® mixers and Schugi® mixers.

Contact dryers are preferable, shovel dryers more preferable and disk dryers most preferable as apparatus in which thermal drying is carried out. Useful dryers include for example Bepex® dryers and Nara® dryers. Fluidized bed dryers can be used as well.

Drying may take place in the mixer itself, by heating the jacket or introducing a stream of warm air. It is similarly possible to use a downstream dryer, for example a tray dryer, a rotary tube oven or a heatable screw. But it is also possible for example to utilize an azeotropic distillation as a drying process.

Preferred drying temperatures are in the range from 50 to 250° C., preferably in the range from 50 to 200° C. and more preferably in the range from 50 to 150° C. The preferred residence time at this temperature in the reaction mixer or dryer is below 30 minutes and more preferably below 10 minutes.

The present invention further provides water absorbing polymers obtainable by the process described above.

The present invention further provides aqueous monomer solutions for preparing water absorbing polymers, comprising a) acrylic acid, which may be partially or completely neutralized,
b) at least one crosslinker,
c) allyl acrylate and/or allyl alcohol,
d) if appropriate one or more ethylenically and/or allylically unsaturated monomers copolymerizable with the monomers identified under a), and
e) if appropriate one or more water soluble polymers, wherein the solution comprises not more than 0.002% by weight of allyl acrylate and/or allyl alcohol, based on acrylic acid, and the components a) to e) being subject to the above remarks.

The present invention further provides water absorbing polymers comprising i) interpolymerized acrylic acid, which may be partially or completely neutralized,
ii) at least one interpolymerized crosslinker,
iii) interpolymerized allyl acrylate and/or allyl alcohol,
iv) if appropriate one or more interpolymerized ethylenically and/or allylically unsaturated monomers copolymerizable with the monomers identified under i), and
v) if appropriate one or more water soluble polymers onto which the monomers identified under i) are at least partially grafted, wherein the polymers comprise not more than 0.002% by weight of interpolymerized allyl acrylate and/or interpolymerized allyl alcohol, based on interpolymerized acrylic acid, and the components i) to v) being mutatis mutandis subject to the remarks relating to the components a) to e).

The present invention further provides processes for producing hygiene articles, especially diapers, comprising the abovementioned process for producing water absorbing polymers.

The present invention further provides hygiene articles, comprising an absorbing layer consisting of 50% to 100% by weight, preferably 60% to 100% by weight, preferably 70% to 100% by weight, more preferably 80% to 100% by weight, most preferably 90% to 100% by weight of water absorbing polymers according to the present invention, the sheath around the absorbent layer not being included of course.

To determine the quality of postcrosslinking, the dried water absorbing polymers are tested using the test methods described hereinbelow.

Methods:

The measurements should unless otherwise stated be carried out at an ambient temperature of 23±2° C. and a relative humidity of 50±10%. The water absorbing polymers are thoroughly mixed through before measurement.

Centrifuge Retention Capacity (CRC)

The centrifuge retention capacity of water absorbing polymers is determined according to EDANA (European Disposables and Nonwovens Association) recommended test method No. 441.2-02 "Centrifuge retention capacity".

Extractables

The level of extractables in the water absorbing polymers is determined according to EDANA (European Disposables and Nonwovens Association) recommended test method No. 470.2-02 "Determination of extractable polymer content by potentiometric titration".

Residual Monomers

The level of residual monomers in the water absorbing polymers is determined according to EDANA (European Disposables and Nonwovens Association) recommended test method No. 410.2-02 "Residual monomers".

Moisture Content of Polymers

The water content of the water absorbing polymers is determined according to EDANA (European Disposables and Nonwovens Association) recommended test method No. 430.2-02 "Moisture content".

EDANA test methods are available for example at European Disposables and Nonwovens Association, Avenue Eugene Plasky 157, B-1030 Brussels, Belgium.

EXAMPLES

Examples 1 to 8

A 10 l capacity polyethylene vessel insulated by foamed plastic was charged with 3 500 g of demineralized water, 1 500 g of acrylic acid and 15 g of 15-tuply ethoxylated trimethylolpropane triacrylate (for example Sartomer® SR9035). 50% by weight aqueous sodium hydroxide solution was added to the acrylic acid solution, which had cooled down to 25° C., to adjust it to a degree of neutralization of 72 mol % by stirring and cooling. Before addition of the polymerization initiator, the monomer solution was inertized by passing nitrogen into it for 30 minutes. The initiator system was added in each case as a dilute aqueous solution to the stirred monomer solution at 4° C. in the order of 0.02% by weight of sodium persulfate, 0.007% by weight of hydrogen peroxide and 0.0015% by weight of ascorbic acid, all based on acrylic acid. Ensuing polymerization caused the temperature to rise to 90° C., and a solid hydrogel formed. The hydrogel was mechanically comminuted, dried at 150° C. for 60 minutes, ground and classified to 100-850 μm by sieving off over- and undersize.

The acrylic acid used comprised defined amounts of allyl acrylate and allyl alcohol.

| Examples | Allyl acrylate | Allyl alcohol | CRC | Extractables | Residual monomers |
| --- | --- | --- | --- | --- | --- |
| 1 | <0.0001 wt % | 0.0001 wt % | 26.8 g/g | 6.9 wt % | 0.267 wt % |
| 2 | <0.0001 wt % | 0.0010 wt % | 26.3 g/g | 7.0 wt % | 0.295 wt % |
| 3 | <0.0001 wt % | 0.0100 wt % | 26.6 g/g | 7.7 wt % | 0.406 wt % |
| 4 | <0.0001 wt % | 0.1000 wt % | 28.5 g/g | 9.3 wt % | 0.565 wt % |
| 5 | 0.0001 wt % | <0.0001 wt % | 28.2 g/g | 7.6 wt % | 0.255 wt % |
| 6 | 0.0010 wt % | <0.0001 wt % | 28.2 g/g | 8.5 wt % | 0.374 wt % |
| 7 | 0.0100 wt % | <0.0001 wt % | 28.7 g/g | 9.0 wt % | 0.397 wt % |
| 8 | 0.1000 wt % | <0.0001 wt % | 27.6 g/g | 9.9 wt % | 0.532 wt % |

We claim:

1. A process for preparing a water absorbing polymer by polymerization of a monomer solution comprising
   a) acrylic acid, which is partially or completely neutralized,
   b) at least one crosslinker,
   c) allyl acrylate and/or allyl alcohol,
   d) optionally one or more ethylenically and/or allylically unsaturated monomer copolymerizable with the monomer identified under a), and
   e) optionally one or more water soluble polymer,
   wherein the solution comprises not more than 0.002% by weight of allyl acrylate and/or allyl alcohol, based on acrylic acid.

2. The process according to claim 1 wherein the water absorbing polymer is postcrosslinked.

3. The process according to claim 1 wherein the acrylic acid is prepared by gas phase oxidation of propane, propene, and/or acrolein.

4. The process according to claim 1 wherein the acrylic acid is purified by crystallization before polymerization.

5. The process according to claim 1 wherein the acrylic acid is purified by at least two stage layer crystallization before polymerization.

6. The process according to claim 4 wherein the acrylic acid comprises not less than 98% by weight of acrylic acid before crystallization.

7. The process according to claim 4 wherein the acrylic acid comprises not less than 0.005% by weight of allyl acrylate and/or allyl alcohol before crystallization.

8. An aqueous monomer solution to prepare a water absorbing polymer which comprises
   a) acrylic acid, which is partially or completely neutralized,
   b) at least one crosslinker,
   c) allyl acrylate and/or allyl alcohol,
   d) optionally one or more ethylenically and/or allylically unsaturated monomer copolymerizable with the monomer identified under a), and
   e) optionally one or more water soluble polymer,
   wherein the solution comprises not more than 0.002% by weight of allyl acrylate and/or allyl alcohol, based on acrylic acid.

9. The aqueous monomer solution according to claim 8 wherein the solution comprises not more than 0.015% by weight of a hydroquinone half ether, based on acrylic acid.

10. A water absorbing polymer comprising
    i) interpolymerized acrylic acid, which is partially or completely neutralized,
    ii) at least one interpolymerized crosslinker,
    iii) interpolymerized allyl acrylate and/or allyl alcohol,
    iv) optionally one or more interpolymerized ethylenically and/or allylically unsaturated monomer copolymerizable with the monomer identified under i), and
    v) optionally one or more water soluble polymer onto which the monomer identified under i) is at least partially grafted,
    wherein the polymer comprises not more than 0.002% by weight of interpolymerized allyl acrylate and/or interpolymerized allyl alcohol, based on interpolymerized acrylic acid.

11. A hygiene article comprising a water absorbing polymer according to claim 10.

12. The process accordingly to claim 5 wherein the acrylic acid comprises not less than 98% by weight of acrylic acid before crystallization.

13. The process according to 5 wherein the acrylic acid comprises not less than 0.005% by weight of allyl acrylate and/or allyl alcohol before crystallization.

* * * * *